July 13, 1954     G. KLEMT ET AL     2,683,395
OPTICAL OBJECTIVE SYSTEM OF THE GAUSS TYPE
COMPRISING FOUR AIR-SPACED MEMBERS
Filed Jan. 5, 1952
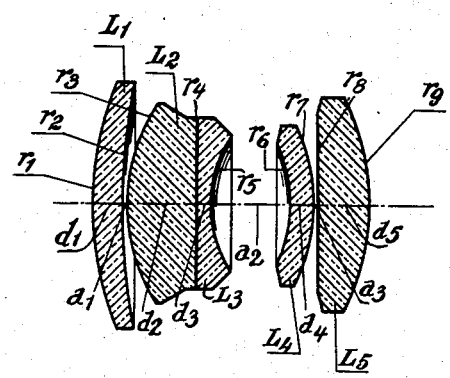
INVENTORS:
GÜNTER KLEMT
KARL H. MACHER
AGENT Patented July 13, 1954

2,683,395

UNITED STATES PATENT OFFICE 2,683,395

OPTICAL OBJECTIVE SYSTEM OF THE GAUSS TYPE COMPRISING FOUR AIR-SPACED MEMBERS

Günter Klemt and Karl Heinrich Macher, Kreuznach, Germany, assignors to Jos. Schneider & Co., Kreuznach, Germany Application January 5, 1952, Serial No. 265,091

Claims priority, application Germany April 23, 1951

3 Claims. (Cl. 88—57)

The present invention relates to an optical system constructed along the lines of the well-known Gaussian dual objective and adapted both for the taking and the reproduction of pictures.

The known objectives of the type referred to consist, generally, of two meniscus-shaped dispersive members, preferably cemented, which between them enclose the diaphragm space, the concave faces of these members facing said diaphragm space. These two inner members are, in turn, positioned between two collective members, one each on the side of the incoming and of the outgoing rays, the forward one of these latter members (seen from the side of the longer light rays) being distinctly meniscus-shaped. The centers of curvature of the refractive surfaces, with the possible exception of the cemented surfaces and of the inner face of the second collective member, are located at the side of the diaphragm. Such objectives generally consist of six to seven lenses, arranged as described, and have long been used for aperture ratios ranging from about 1:3.3 to 1:1.4.

The main object of this invention is to provide an optical system of this general character which, while retaining the properties of such objectives to correct for sphero-chromatic aberration of rays incident parallel or inclined to the optical axis, astigmatism, image field curvature and other distortion, consists of not more than five lenses forming four air-spaced members. According to the invention a dispersive meniscus is positioned both in front and in back of the diaphragm space in the known manner, only the forward one of these members being, however, cemented; this set of members is, in turn, inserted between a front and a rear collective member of which the first is distinctly and the second at least roughly meniscus-shaped.

In accordance with the invention it has been found that the reduction in corrective power due to the omission of a lens may be compensated, especially for the purpose of eliminating residual coma, by the use of extremely highly refractive glass in the two collective menisci as well as in at least the positive portion of the first dispersive meniscus and in the second dispersive member. A feature of the invention, accordingly, resides in the use of a lens material for all of the lenses of the system whose refractive index for the yellow helium line is greater than 1.64, with the refractive index of the two outer, collective menisci above 1.69 and with that of the second inner, dispersive meniscus above 1.78, the difference between the refractive indices of the forward lens of the compound dispersive member following the first collective member and of the lens cemented to said forward lens being, moreover, less than 0.02.

It has also been found that with a system according to the invention a satisfactory flattening of the image field and favorable control of the upper coma rays can be accomplished if the radii of the dispersive meniscus positioned ahead of the diaphragm are so dimensioned that the ratio between the lengths of the outer front radius and the outer rear radius lies between 1.4 and 1.6 while at the same time the length of said outer front radius is substantially less than 0.4 times the overall focal length of the system.

A further feature of the invention, desirable for improving the image field portions remote from the axis, resides in dimensioning the total axial length of the system at about 0.5 times the overall focal length thereof.

A preferred embodiment of the invention has been illustrated, somewhat schematically, in the sole figure of the accompanying drawing.

As shown in the drawing, the objective according to the invenion comprises a first collective meniscus consisting of a simple lens $L_1$ having a thickness $d_1$ and radii of curvature $r_1$, $r_2$; a first dispersive meniscus consisting of two cemented lenses $L_2$ (thickness $d_2$) and $L_3$ (thickness $d_3$), spaced by a distance $a_1$ from lens $L_1$ and having radii $r_3$, $r_4$ and $r_5$ (all positive in the embodiment illustrated); a second dispersive meniscus consisting of a simple lens $L_4$ having a thickness $d_4$ and radii $r_6$ and $r_7$, the air space $a_2$ between the latter and the composite member $L_2$, $L_3$ serving to receive the diaphragm (not shown) in a manner well known per se; and a second collective member consisting of a simple, roughly meniscus-shaped lens $L_5$ having a thickness $d_5$ and radii $r_8$, $r_9$, the spacing between the lenses $L_4$ and $L_5$ being indicated at $a_3$.

Representative values (in millimeters) of the parameters indicated in the drawing (radii $r$, thicknesses $d$ and distances $a$) have been given, by way of example, in the following table, the overall focal length (with respect to the yellow helium line) being f=100 mm. Also indicated in the table are the indices of refraction $n_d$ for the yellow helium line and the Abbé numbers $V_d$ for the respective lenses $L_1$–$L_5$. An aperture ratio of 1:2.8 has been assumed.

|  |  |  | $n_d$ | $V_d$ |
|---|---|---|---|---|
| $r_1=+\ 63.63$ | | | | |
| | $d_1=\ 6.26$ | $L_1$ | 1.7740 | 44.7 |
| $r_2=+155.84$ | | | | |
| | $a_1=\ 0.24$ | air space | | |
| $r_3=+\ 36.29$ | | | | |
| | $d_2=14.39$ | $L_2$ | 1.6583 | 57.1 |
| $r_4=+771.17$ | | | | |
| | $d_3=\ 1.77$ | $L_3$ | 1.6483 | 33.8 |
| $r_5=+\ 23.96$ | | | | |
| | $a_2=15.86$ | air space | | |
| $r_6=-\ 25.68$ | | | | |
| | $d_4=\ 4.94$ | $L_4$ | 1.7847 | 25.7 |
| $r_7=-\ 35.84$ | | | | |
| | $a_3=\ 0.16$ | air space | | |
| $r_8=-360.68$ | | | | |
| | $d_5=10.60$ | $L_5$ | 1.6935 | 53.5 |
| $r_9=-\ 43.45$ | | | | |
| total axial length=54.22 | | | | |

It will be noted from the foregoing table that the objective dimensioned in accordance therewith and illustrated in the drawing consists of five lenses all of which have a refractive index greater than 1.64, that of the lenses $L_1$ and $L_5$ being above 1.69 and that of the rear dispersive meniscus being above 1.78. The difference between the refractive indices of the lenses $L_2$ and $L_3$ is 0.01, being thus substantially less than 0.02. The ratio of the radii $r_3$ and $r_5$ is approximately 1.5, being thus between 1.4 and 1.6, the outer radius $r_3$ of 36.29 mm. length being at the same time less than 0.4 times but greater than 0.2 times the overall focal length $f$ which equals 100 mm. The total axial length of the system, computed as the sum of all thicknesses $d$ and spacings $a$, is given with 54.22 mm., being thus more than 0.45 times but less than 0.60 times the overall focal length in keeping with the aforestated requirement for optimal results.

It should be understood that departures from the specific arrangement illustrated and from the precise values given above are permissible without departing from the spirit and scope of the invention as defined in the appended claims.

What is claimed is:

1. An optical objective system of the Gaussian type, comprising four at least roughly meniscus-shaped, air-spaced members consisting altogether of a first, second, third, fourth and fifth lens, said second and said third lens being cemented together and forming the first of an inner, dispersive pair of said members enclosed by an outer, collective pair of said members, the members of each pair having their convex sides averted from each other, each of said lenses consisting of a lens material having a refractive index for the yellow helium line greater than 1.64, the refractive indices of said outer members being greater than 1.69, the refractive index of the second of said inner members being greater than 1.78, the difference between the refractive indices of said second and said third lens being less than 0.02, the ratio of the outer radius of said second lens to the outer radius of said third lens being between 1.4 and 1.6, the outer radius of said second lens being less than 0.4 times the overall focal length of the system but at least 0.2 times said overall focal length.

2. An optical system according to claim 1 wherein the total axial length of the system is more than 0.45 but less than 0.60 times the overall focal length thereof.

3. An optical system according to claim 1 wherein the radii $r_1$, $r_2$ of the first lens $L_1$, the radii $r_3$, $r_4$ of the second lens $L_2$, the radii $r_4$, $r_5$ of the third lens $L_3$, the radii $r_6$, $r_7$ of the fourth lens $L_4$ and the radii $r_8$, $r_9$ of the fifth lens $L_5$, the axial thicknesses $d_1$, $d_2$, $d_3$, $d_4$ and $d_5$ of said lenses, the air spacings $a_1$, $a_2$ and $a_3$ between said members, the refractive indices $n_d$ of said lenses and the Abbé numbers $V_d$ of said lenses have substantially the numerical values given in the following table, the overall focal length of the system for the yellow helium line having the numerical value of 100 with an aperture ratio of substantially 1:2.8:

Lens $L_1$: $r_1=+63.63$, $r_2=+155.84$, $d_1=6.26$,
$n_d=1.7440$, $V_d=44.7$
Air space $a_1=0.24$
Lens $L_2$: $r_3=+36.29$, $r_4=+771.17$, $d_2=14.39$,
$n_d=1.6583$, $V_d=57.1$
Lens $L_3$: $r_4=+771.17$, $r_5=+23.96$, $d_3=1.77$,
$n_d=1.6483$, $V_d=33.8$
Air space $a_2=15.86$
Lens $L_4$: $r_6=-25.68$, $r_7=-35.84$, $d_4=4.94$,
$n_d=1.7847$, $V_d=25.7$
Air space $a_3=0.16$
Lens $L_5$: $r_8=-360.68$, $r_9=-43.45$, $d_5=10.60$,
$n_d=1.6935$, $V_d=53.5$.

References Cited in the file of this patent

UNITED STATES PATENTS

| Number | Name | Date |
|---|---|---|
| 1,955,591 | Lee | Apr. 17, 1934 |
| 2,171,640 | Berek | Sept. 5, 1939 |
| 2,487,749 | Wynne | Nov. 8, 1949 |
| 2,499,264 | Wynne | Feb. 28, 1950 |

FOREIGN PATENTS

| Number | Country | Date |
|---|---|---|
| 665,520 | Germany | Sept. 27, 1938 |